Patented Nov. 14, 1950

2,529,549

UNITED STATES PATENT OFFICE 2,529,549

METHOD OF CLEANING CEMENT SURFACES PREPARATORY TO PAINTING

Irving A. Halpern, North Hollywood, Calif.

No Drawing. Application June 30, 1947, Serial No. 758,227

4 Claims. (Cl. 134—6)

This invention relates to a method for cleaning concrete floors and runways preparatory to painting.

An object of the invention is to provide a method for cleaning a cement or concrete surface, either used or new, preparatory to painting, which is simple and effective and involves few hazards to associated structures and personnel during or after use.

This and other objects are attained by my invention, which will be understood from the following detailed description.

It is well known that concrete or cement surfaces either new or after they have been soiled by oil, grease, etc., cannot be satisfactorily painted without pre-treatment. Methods which have heretofore been used, include the use of volatile acids and/or corrosive alkalies which are not only difficult and dangerous to handle but are expensive, and unless the treatment is properly carried out, result in residual materials which are deleterious to the subsequently applied paint and cause poor adhesion to the concrete surface. In addition, the previous treatments have only partially removed oil and grease stains which accumulate on airport runways and shop floors, and any unremoved oil or grease stains either show through the paint coating or eventually cause the paint to peel from the surface. If not lightened in color, the dark stains from oil and grease require usually more than one coat of paint, particularly if the paint is of light shade, or poor covering quality.

I have discovered that both new and soiled cement floors and runways may be thoroughly cleaned, whitened, and suitably etched to provide good adhesion of paint coatings by treatment with a composition containing phosphoric acid, a volatile alcohol and a wetting agent made up in concentrated aqueous solution. I have also found that satisfactory results are obtained only by applying this composition following a preferred procedure consisting of spreading the mixture on the cement surface, scrubbing with a stiff brush, followed by dilution of the material remaining on the surface by adding a limited additional amount of water, followed by further scrubbing with a stiff brush. After this treatment, the surface sludge material is removed by squeegeeing and finally the surface is washed with an excess of water.

My preferred composition consists of one-half gallon of orthophosphoric acid (75% acid); one-fourth gallon isopropyl alcohol; 2.5 grams of "Santomerse D" consisting essentially of an arylalkyl sulfonate wetting agent and enough water to make the total volume one gallon. This preferred mixture is applied to new or used and dirty concrete surfaces using about one gallon per one hundred square feet. The liquid is distributed over the surface and is then scrubbed for three to five minutes with a stiff brush following which one-half gallon of water is added by distribution over each one hundred square feet surface, and the scrubbing with the stiff brush is continued with this diluted solution for from three to five minutes. The mixture on the surface is then preferably removed by scraping or squeegeeing following which the surface is washed off with excess water as from a hose. A surface prepared for painting by this method of cleaning is made lighter in color because of the disposition of finely divided calcium phosphate on the surface due to the reaction of the lime in the concrete and the phosphoric acid ingredient of the cleaning mixture. Also because of reaction with the ingredients of the composition, the surface is sufficiently roughened (microscopically) so that the subsequent paint coating adheres well to the surface. The wetting agent and the volatile alcohol together with the phosphoric acid removes the grease and oil stains and acts as a detergent for other forms of dirt. After the surface has been treated with the composition and scrubbed with a stiff brush to produce the desired reaction over the entire surface and following removal of the excess composition with the emulsified dirt, etc., a quick rinsing with water by hosing or otherwise is all that is required. The surface dries quickly both because the pores are partially sealed by the deposited calcium phosphate and also because water is taken up to form water of crystallization of some compounds produced by the treatment. The ordinary concrete paints may be applied within a few hours after the surface has been cleaned by my composition and method.

The composition may be varied from the above preferred mixture over a considerable range. The phosphoric acid may be varied from five to eighty percent by volume of composition. Too small an amount of phosphoric acid does not give sufficient chemical activity to clean the concrete; and too large an amount, that is above about eighty percent, causes a heavy precipitate immediately after application of the composition to the surface, which prevents the desired detergent action. The isopropyl alcohol and water content may be varied from twenty to ninety-five percent by volume, the proportions of these two ingredients being approximately one of isopropyl alcohol to one and one-half parts by volume of water. The proportion of the wetting agent may be varied widely and the optimum amount will, of course, depend upon the proportions of the principal ingredients, in general about five-hundredths to five-tenths percent of a wetting agent such as Santomerse D gives satisfactory results.

I prefer to use the commercial grade of orthophosphoric acid known as 75% because of its lower cost, although obviously other concentrations of orthophosphoric acid may be used with suitable changes in the amount of water added to the composition to compensate for the change in the water introduced through the phosphoric acid ingredient.

Any of the common volatile alcohols which are volatile at room or operative temperatures may be used, for example ethyl, methyl, propyl, isopropyl, and normal, secondary and tertiary butyl alcohols; however, methyl alcohol is so volatile that it tends to evaporate too rapidly under some operative temperatures for best results in carrying out my process. Ethyl alcohol or isopropyl alcohol are preferred because of their low cost and suitable rate of evaporation. The butyl alcohols are slower in solvent action and in rate of evaporation, although they may be successfully used.

A wide variety of wetting agents which are effective in strong acid media may be used and particularly the group known as aryl-alkyl sulfonates of which "Santomerse D" is a typical example, which are particularly efficacious in my composition and method.

The preferred method as above described appears to be essential for the best operation. The scrubbing is necessary in order to get penetration of the solution into the surface pits and to physically remove any non-adhering particles. The repeated scrubbing with the more dilute solution is necessary in order to get the calcium phosphate precipitate spread over the entire surface. This precipitated phosphate when deposed under the conditions stated adheres closely to the concrete and lightens its color and wholly or partially masks any unremoved stains. The physical removal of the sludge after the scrubbing operations is important to avoid the deposition of a thick surface crust or coating of precipitated calcium phosphate which would result if the surface material were immediately diluted with an excess of water. The final washing with water is for the purpose of removing surface acid and non-adhering particles. Any acid which soaks in or penetrates the concrete reacts with the lime to form an insoluble calcium phosphate and therefore does not later damage the paint or surface.

The advantages of my composition and method will be apparent from the above description. The cleaning operation is relatively simple, there are no residual materials or fumes which might be harmful to personnel or to metal machinery, and there is little danger of injury to machinery which is fixed to the floor, during the cleaning procedure. The cost of cleaning by use of my composition and method is low enough to be commercially successful.

I claim:

1. The method of cleaning cement and concrete surfaces preparatory to painting, consisting essentially of the steps of spreading over the surface to be cleaned an aqueous solution containing from five to eighty parts by volume of phosphoric acid (75%), twenty to ninety-five parts by volume of a solution in water of an alcohol volatile at room temperature, said water and alcohol being in proportions by volume of one to one-and-one-half of water to one volume of alcohol and an effective amount of a wetting agent for cement surfaces under strong acid conditions; brush-scrubbing the surface; adding a limited amount of water to the mixture on the surface; repeating the brush-scrubbing; scraping off the excess mixture; and washing off the surface with a large excess of water.

2. The method of cleaning cement and concrete surfaces preparatory to painting, consisting essentially of the steps of spreading over the surface to be cleaned an aqueous solution containing 5 to 80 parts by volume of phosphoric acid 20 to 90 parts by volume of a solution in water of isopropyl alcohol, said water and alcohol being in proportions by volume of one to one-and-one-half of water to one volume of alcohol, and a wetting agent effective for wetting cement surfaces under strong acid conditions; brush-scrubbing the surface; adding a limited amount of water to the mixture on the surface; repeating the brush-scrubbing; scraping off the excess mixture; and washing off the surface with a large excess of water.

3. The method of cleaning cement and concrete surfaces preparatory to painting, consisting essentially of the steps of spreading over the surface to be cleaned an aqueous solution containing for each one hundred square feet of surface to be cleaned one-half gallon of phosphoric acid (75%), one-fourth gallon of isopropyl alcohol, water to make one gallon, and .05 to .50 percent by weight of a wetting agent for cement surfaces effective in acid-alcohol-water solution; brush-scrubbing the surface; adding a limited amount of water to the mixture distributed over the surface; repeating the brush-scrubbing; scraping off the excess mixture; and washing off the surface with a large excess of water.

4. The method of cleaning cement and concrete surfaces preparatory to painting, consisting essentially of the steps of spreading over the surface to be cleaned an aqueous solution containing for each one hundred square feet of surface to be cleaned one-half gallon of phosphoric acid (75%), one-fourth gallon of ethyl alcohol, water to make one gallon, and .05 to .50 percent by weight of a wetting agent for cement surfaces effective in acid-alcohol-water solution; brush-scrubbing the surface; adding a limited amount of water to the mixture distributed over the surface; repeating the brush-scrubbing; scraping off the excess mixture; and washing off the surface with a large excess of water.

IRVING A. HALPERN.

REFERENCES CITED

The following references are of record in the file of this patent:

UNITED STATES PATENTS

| Number | Name | Date |
|---|---|---|
| 147,250 | Elliott | Feb. 10, 1874 |
| 1,949,713 | Gravell | Mar. 6, 1934 |
| 2,221,968 | Friedman | Nov. 19, 1940 |
| 2,241,790 | Rembert | May 13, 1941 |
| 2,408,155 | Thornbury | Sept. 24, 1946 |